US012637014B2

(12) United States Patent
Rutman et al.

(10) Patent No.: US 12,637,014 B2
(45) Date of Patent: May 26, 2026

(54) INSERTS FOR BASE PLATE WITH APERTURES

(71) Applicant: Ford Global Technologies, LLC, Dearborn, MI (US)

(72) Inventors: Matthew B. Rutman, Westland, MI (US); Stuart C. Salter, White Lake, MI (US); Michael M. Azzouz, Farmington, MI (US); Dan Ritz, Windsor (CA); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 699 days.

(21) Appl. No.: 18/107,276

(22) Filed: Feb. 8, 2023

(65) Prior Publication Data

US 2024/0262295 A1 Aug. 8, 2024

(51) Int. Cl.
B60R 9/00 (2006.01)
B60R 9/06 (2006.01)
B62D 65/16 (2006.01)

(52) U.S. Cl.
CPC ................ B60R 9/06 (2013.01); B62D 65/16 (2013.01)

(58) Field of Classification Search
CPC ... B60R 9/06; B60R 9/065; B60P 7/10; B60P 7/0807; B62D 65/16
USPC ........................................................ 296/1.07
See application file for complete search history.

(56) References Cited

U.S. PATENT DOCUMENTS

| | | | |
|---|---|---|---|
| 10,557,275 B2 * | 2/2020 | Lescord | .................... E04G 1/36 |
| 10,583,962 B2 | 3/2020 | Brunner et al. | |
| 10,703,534 B2 | 7/2020 | Brunner et al. | |
| D895,966 S | 9/2020 | Brunner et al. | |
| D895,967 S | 9/2020 | Brunner et al. | |
| D896,517 S | 9/2020 | Brunner et al. | |
| D896,518 S | 9/2020 | Brunner et al. | |
| D897,103 S | 9/2020 | Brunner et al. | |
| D898,320 S | 10/2020 | Brunner et al. | |
| 10,829,059 B1 | 11/2020 | Addison et al. | |
| 10,919,428 B2 | 2/2021 | Wallace et al. | |
| 10,962,218 B2 | 3/2021 | Plato et al. | |
| 10,981,696 B2 | 4/2021 | Brunner et al. | |
| D917,977 S | 5/2021 | Brunner et al. | |
| D918,584 S | 5/2021 | Brunner et al. | |
| D919,296 S | 5/2021 | Brunner et al. | |
| 11,008,136 B2 | 5/2021 | Brunner et al. | |
| D920,671 S | 6/2021 | Brunner et al. | |
| 11,027,883 B1 | 6/2021 | Brunner et al. | |
| D923,935 S | 7/2021 | Brunner et al. | |
| 11,192,690 B1 | 12/2021 | Brunner et al. | |
| 11,268,691 B2 | 3/2022 | Plato et al. | |
| 11,365,026 B2 | 6/2022 | Brunner et al. | |
| 11,427,382 B2 | 8/2022 | Brunner et al. | |

(Continued)

OTHER PUBLICATIONS

US 10,947,009 B2, 03/2021, Brunner et al. (withdrawn)

*Primary Examiner* — Steven O Douglas
(74) *Attorney, Agent, or Firm* — Vichit Chea; Carlson, Gaskey & Olds, P.C.

(57) ABSTRACT

A base plate for an accessory attachment system includes a plurality of apertures. At least a first set of apertures of the plurality of apertures are configured to receive a mounting foot from an accessory to be mounted on the base plate. The base plate also includes an insert that is mounted in the apertures of the first set of apertures.

20 Claims, 5 Drawing Sheets

(56)                    References Cited

U.S. PATENT DOCUMENTS

| 11,465,805  | B2    | 10/2022  | Brunner et al. |            |
|-------------|-------|----------|----------------|------------|
| 12,221,071  | B2 *  | 2/2025   | Levine         | B60R 9/065 |
| 2006/0033377 | A1   | 2/2006   | Frimel         |            |
| 2008/0260486 | A1   | 10/2008  | Bequette       |            |
| 2013/0094931 | A1   | 4/2013   | Bluhm          |            |
| 2020/0391645 | A1   | 12/2020  | Ieradi         |            |
| 2022/0009562 | A1   | 1/2022   | Mannone        |            |
| 2022/0126928 | A1   | 4/2022   | Elder et al.   |            |
| 2023/0116745 | A1 * | 4/2023   | Salter         | B60P 7/10  |
|             |       |          |                | 248/542    |
| 2024/0166121 | A1 * | 5/2024   | Salter         | B60R 11/06 |
| 2024/0409036 | A1 * | 12/2024  | Levine         | B60R 16/03 |

* cited by examiner

INSERTS FOR BASE PLATE WITH APERTURES

TECHNICAL FIELD

This disclosure relates generally to a base plate that is used to secure accessories within a cargo or work area, more particularly, to a base plate that includes inserts in apertures formed in the base plate.

BACKGROUND

Vehicles transport various types of cargo. A user can, for example, rely on a vehicle to transport accessories, such as containers and tools, to and from a jobsite. The accessories that need to be transported can vary based on the tasks the user performs at the jobsite. Support surfaces in cargo or work areas may be configured to securely support the accessories.

SUMMARY

In some aspects, the techniques described herein relate to a base plate for an accessory attachment system, including: a plurality of apertures, wherein at least a first set of apertures of the plurality of apertures are configured to receive a mounting foot from an accessory to be mounted on the base plate; and an insert that is mounted in apertures of the first set of apertures.

In some aspects, the techniques described herein relate to a base plate, wherein the insert is made from a plastic material.

In some aspects, the techniques described herein relate to a base plate for an accessory attachment system, wherein the insert comprises an outer peripheral surface that is defined by a polygonal shape.

In some aspects, the techniques described herein relate to a base plate for an accessory attachment system, wherein apertures in the first set of apertures have a polygonal shape that matches the polygonal shape of the insert.

In some aspects, the techniques described herein relate to a base plate for an accessory attachment system, wherein each polygonal shape comprises a diamond shape.

In some aspects, the techniques described herein relate to a base plate for an accessory attachment system, wherein each polygonal shape has at least eight linear segments.

In some aspects, the techniques described herein relate to a base plate for an accessory attachment system, wherein the insert includes a plurality of hinges configured to be bent around edges of the apertures.

In some aspects, the techniques described herein relate to a base plate for an accessory attachment system, wherein the insert comprises a flat upper body portion defined by an outer peripheral surface, and which includes a center opening that aligns with a respective aperture and defines an inner peripheral surface of the respective aperture, and wherein the plurality of hinges are formed about the inner peripheral surface.

In some aspects, the techniques described herein relate to a base plate for an accessory attachment system, wherein the plurality of hinges comprise living hinges.

In some aspects, the techniques described herein relate to a base plate for an accessory attachment system, wherein the first set of apertures comprise mounting foot apertures, and wherein the plurality of apertures include a second set of apertures that comprise power connection apertures through which the accessory can be connected to a power interface through the base plate.

In some aspects, the techniques described herein relate to a base plate for an accessory attachment system, wherein the first set of apertures comprise mounting foot apertures, and wherein the plurality of apertures include a second set of apertures that comprise locking apertures through which the accessory can be locked to the base plate.

In some aspects, the techniques described herein relate to an assembly including: a base plate for an accessory attachment system, wherein the base plate includes a plurality of apertures; at least one accessory to be mounted to the base plate, wherein the at least one accessory includes at least one mounting foot, and wherein at least a first set of apertures of the plurality of apertures comprise mounting foot apertures that are configured to receive the at least one mounting foot; and an insert that is mounted in each mounting foot aperture.

In some aspects, the techniques described herein relate to an assembly, wherein the plurality of apertures include a second set of apertures that comprise locking apertures through which the at least one accessory can be locked to the base plate, and/or wherein the plurality of apertures include a third set of apertures that comprise power connection apertures through which the at least one accessory can be connected to a power interface through the base plate.

In some aspects, the techniques described herein relate to an assembly, wherein inserts are only mounted within mounting foot apertures.

In some aspects, the techniques described herein relate to an assembly, wherein each insert is made from a plastic material, and wherein each insert has an outer peripheral surface and an inner peripheral surface that includes a plurality of living hinges to be bent over edges of a respective mounting foot aperture.

In some aspects, the techniques described herein relate to an assembly, wherein the insert comprises an outer peripheral surface that is defined by a polygonal shape, and wherein the mounting foot apertures have a polygonal shape that matches the polygonal shape of the insert.

In some aspects, the techniques described herein relate to an assembly, wherein each polygonal shape comprises a diamond shape.

In some aspects, the techniques described herein relate to a method, including: providing a plurality of mounting foot apertures in a base plate for an accessory attachment system; providing at least one accessory that includes at least one mounting foot; installing an insert into each of the mounting foot apertures; and inserting the at least one mounting foot through the insert in one of the mounting foot apertures to mount the at least one accessory to the base plate.

In some aspects, the techniques described herein relate to a method, including: providing a plurality of locking apertures through which the at least one accessory can be locked to the base plate, and/or providing a plurality of power connection apertures through which the at least one accessory can be connected to a power interface through the base plate; and only mounting inserts within the mounting foot apertures.

In some aspects, the techniques described herein relate to a method, wherein the insert has an outer peripheral surface and an inner peripheral surface, and the method further includes forming the inner peripheral surface to have a plurality of living hinges and bending the plurality of living hinges around edges that define the mounting foot apertures.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a base plate that is used with an accessory attachment system for a vehicle or stationary application. The base plate provides an attachment interface for securing the accessories in place within a cargo or work area. Various types of accessories can be secured to the vehicle through the attachment interface provided by the base plate. The number and positions of base plates can be adjusted for particular vehicles or particular needs.

There are often situations where it would be useful for the vehicle owner to be able to switch between accessories to enable different functional capabilities, or to temporarily remove an accessory or module to allow the module or its contents to be used off the vehicle, then reattach the module once the desired operation or task is completed. It is also useful to be able to provide power connection interfaces on the base plates to allow charging of accessories such as power tools, for example. The subject disclosure provides a base plate construction that has high strength and low weight, and which allows a mechanical attachment to the vehicle via a quick connect/disconnect capability, while also providing various power connection interfaces for charging and locking features to make sure that the accessories are securely held in place.

Figure 1A:
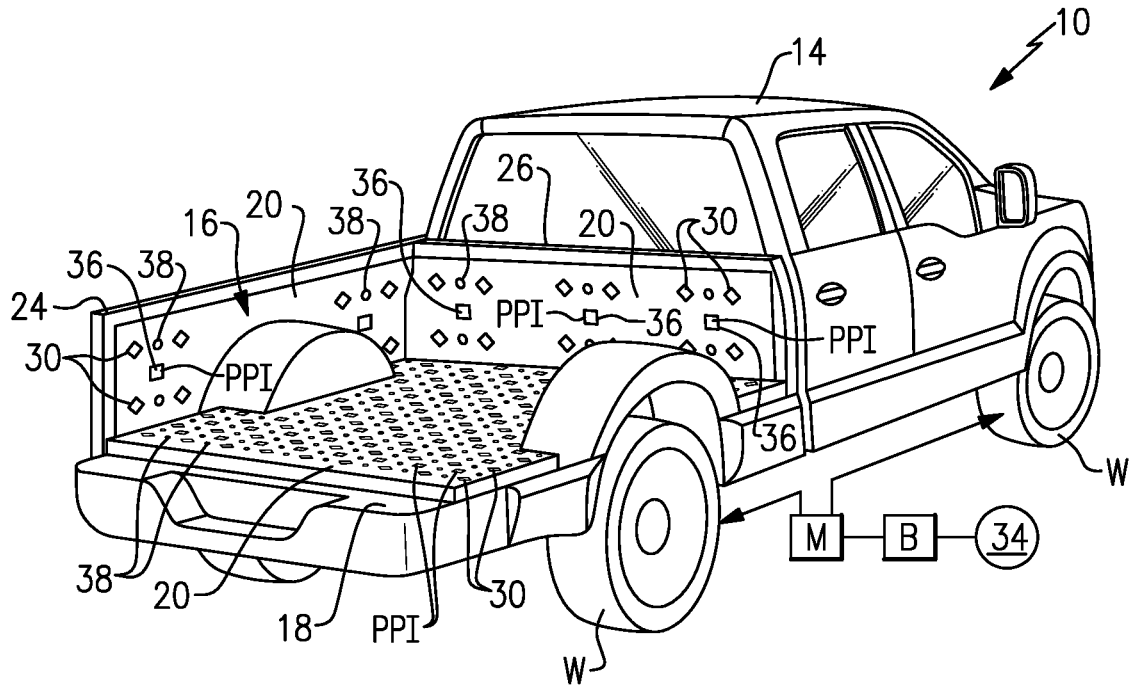
FIG. 1A illustrates a perspective view of a vehicle having a cargo bed equipped with base plates that can be used to secure an accessory according to an exemplary aspect of the present disclosure.
Figure 1B:
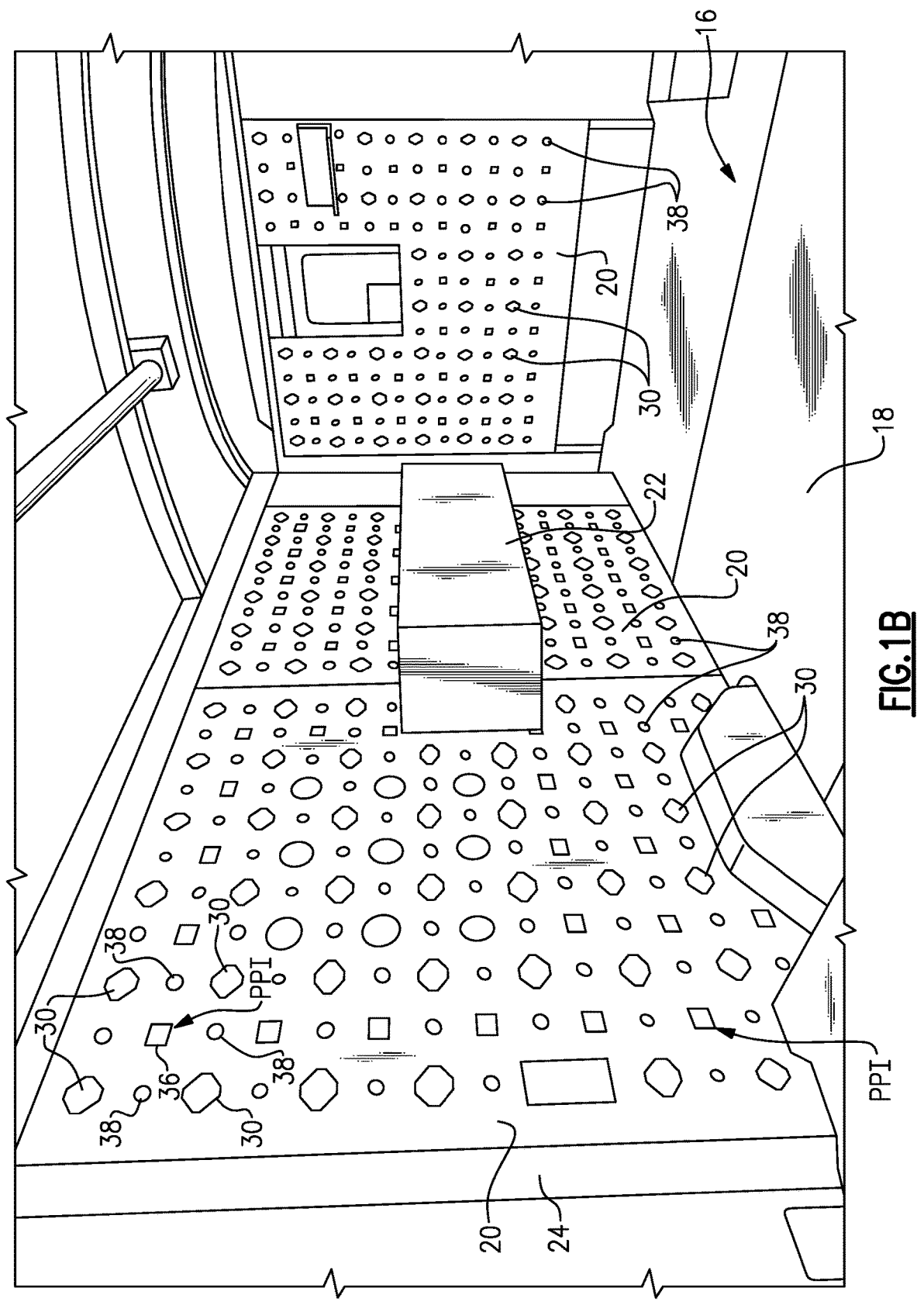
FIG. 1B illustrates a perspective view of a van having a cargo area equipped with base plates that can be used to secure accessories according to an exemplary aspect of the present disclosure.
Figure 2:
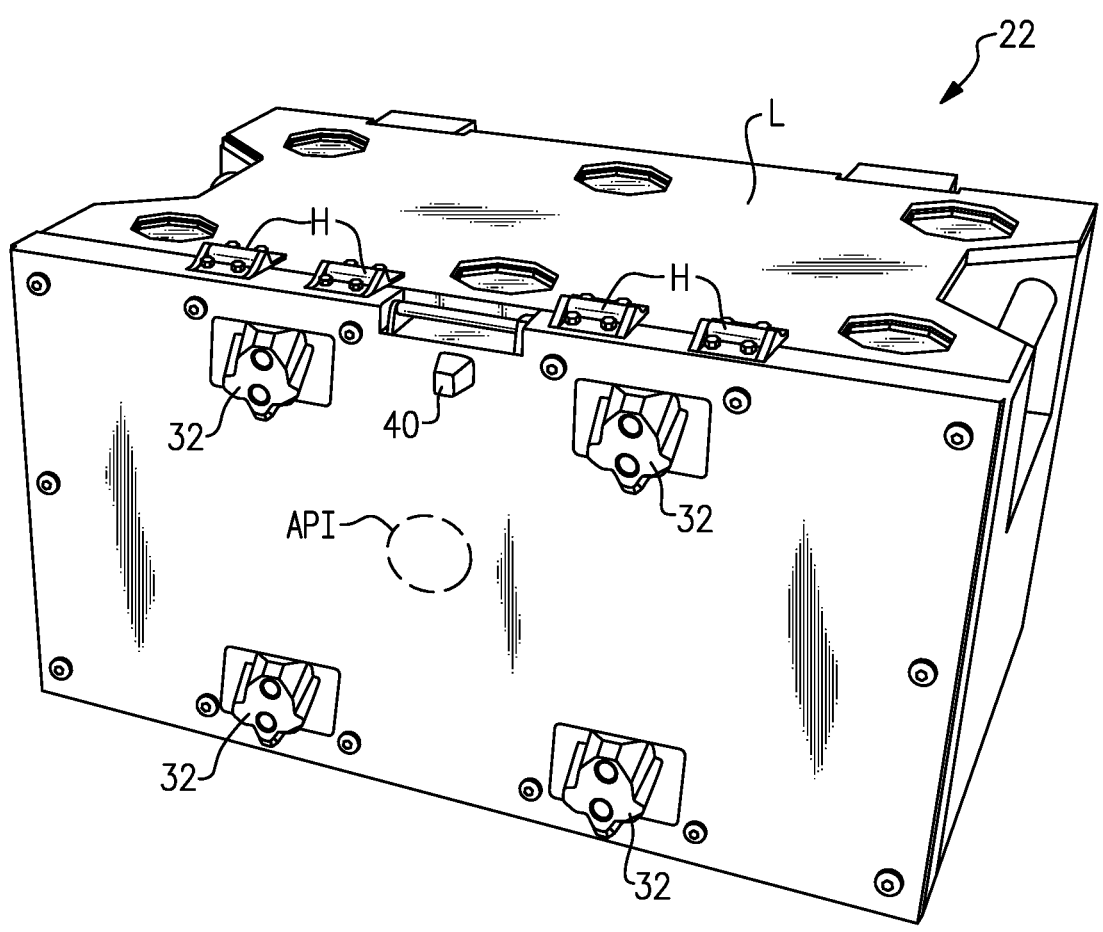
FIG. 2 illustrates a perspective view of an example accessory to be attached to the base plate.

With reference to FIGS. 1A and 2, a vehicle 10 includes a passenger compartment 14 and a cargo bed 16 that is aft of the passenger compartment 14. The cargo bed 16 has a floor 18. In this example, the vehicle 10 is a pickup truck. However, the vehicle 10 could be another type of vehicle in another example, such as a car, van, sport utility vehicle, etc. FIG. 1B shows an example of a van that incorporates a base plate with an accessory attachment and locking system.

The example vehicle 10 is an electrified vehicle and, in particular, a battery electric vehicle (BEV). In another example, the vehicle 10 could be another type of electrified vehicle, such as a plug-in hybrid electric vehicle (PHEV), or a conventional internal combustion engine vehicle.

In particular, the example vehicle 10 includes an electrified powertrain capable of applying a torque from an electric machine M (e.g., an electric motor) to drive a pair of wheels W. The vehicle 10 can include a traction battery pack B, which powers the electric machine M and, potentially, other electrical loads of the vehicle 10.

Figure 1C:
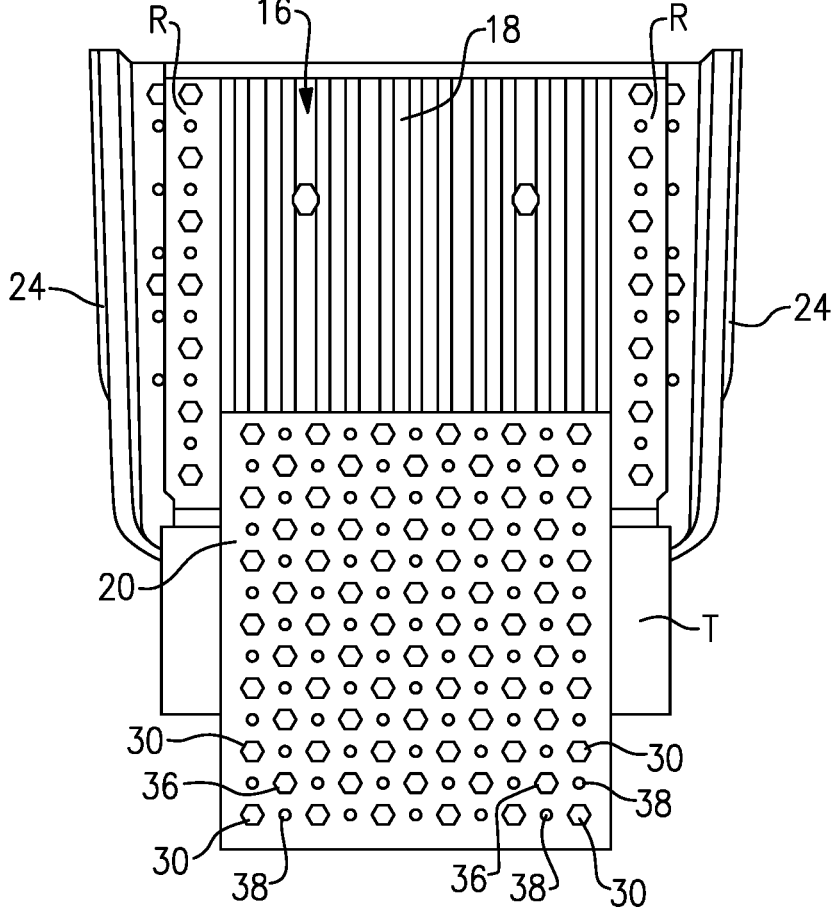
FIG. 1C illustrates a top view of a vehicle where the base plate can be slid out of the cargo area to make the base plate more accessible.

In the exemplary embodiment, a plurality of base plates 20 are used to support one or more accessories and/or modules 22. In one example, the cargo bed 16 is defined by a pair of side walls 24 (only one is shown in FIG. 1A for purposes of clarity), a rear wall 26, and a tailgate T (FIG. 1C). In one example, the base plates 20 are secured directly to walls 24, 26 and/or to the floor 18 of the cargo bed 16 by fastening, welding, etc., at a first connection interface. In another example shown in FIG. 1C, the base plates 20 can be supported for sliding movement within the cargo bed 16 on rails R or other types of sliding structures. The accessories and/or modules 22 can be secured to the vehicle 10 by engaging one or more of the base plates 20 via a second connection interface between the accessory 22 and the base plate 20. The accessories/modules 22 can comprise a lockable storage box that holds tools, a container, a refrigerator, etc. For example, the accessory 22 could be a lockable container having a lid L attached within hinges H (FIG. 2), and which includes a compartment for storing power tools or other items that require power or data connection.

As shown in FIGS. 1A-1C, the base plates 20 include a plurality of openings or apertures 30. As shown in FIG. 2, an example accessory 22 comprises a lockable container or box 22 that includes one or more mounting feet 32. The box 22 can engage the base plate 20 using an attachment system comprising the plurality of apertures 30 and the mounting feet 32 that cooperate to provide a mechanical connection interface. In this example, the base plates 20 provide the apertures 30 and the accessories 22 include the feet 32. This could be rearranged, however, such that one or all of the feet 32 extend from the base plates 20 and the accessories 22 provide some or all of the apertures 30. The apertures 30 are spaced upwardly from the floor 18 or side wall 24, 26 by an open gap such that the feet 32 from the accessory 22 can be easily inserted into the base plate 20 to attach the accessory 22 to the base plate 20. The accessory 22 can then be removed and replaced with a different accessory 22 as needed. The user can, for example, hold tools for a certain type of job within the accessory 22. When the user needs to work on a different second type of job, the user can swap the accessory 22 for another accessory 22 having specialized tools for the second type of job.

As discussed above, in this example, the accessory 22 comprises a lockable box that is mechanically coupled to the vehicle 10 via the base plate 20. The accessory 22 could additionally include a power connection interface 34 that would be able to supply power to the box itself as well as any tools/devices within the box that would require charging. The power connection interface 34 is powered from the vehicle power supply, such as the battery pack B, for example. Any devices within the lockable box, e.g. rechargeable tools, could be recharged when set within the box and coupled to a charging interface associated with the power connection interface 34 between the accessory 22 and the base plate 20.

In one example, the base plate 20 can also be plugged into either 12V vehicle power or other power sources via a variety of connections/outlets. These power sources supply power to charge or power the accessories 22 via the power supply connection interface 34 associated with the base plate 20. Each accessory 22 has an accessory power interface (API) as shown in FIG. 2. At least some, or all, of the mounting locations for an accessory 22 have a charging interface with a plate power interface (PPI) as shown in FIGS. 1A-1B. The API and the PPI can be a direct electrical connection or can be via an inductive wireless charging connection. The PPI receives vehicle power via the vehicle power supply or other power source.

In one example, the base plate 20 is made from a layered construction to provide a high strength support while not adversely affecting weight. The base plate 20 can comprise a side mounted attachment interface between the accessory box 22 and the base plate 20 or can comprise a bottom mounted attachment. In the side mounted example, the feet 32 are on the side of the accessory 20 and the base plate 20 is configured to be positioned within the vehicle cargo bed 16 at the side wall 24 that extends upwardly from the floor surface of the truck bed in a vertical direction as shown in FIG. 1A, or at the side wall 24 in the van of FIG. 1B. In the bottom mounted example, the bottom of the accessory 22 includes the feet 32 which fit into apertures 30 formed in a base plate 20 that is located on the floor 18 of the truck or van.

The apertures 30 are formed within the base plate 20 and comprise a plate attachment interface. The base plate 20 also includes an opening or aperture 36 for the PPI and an opening or aperture 38 for a locking feature that allows the accessory 22 to be securely locked to the base plate 20. These apertures 30, 36, 38 are provided at multiple locations on the base plate 20, and are formed in a desired pattern on the base plate 20 to allow for the accessories 22 to be mounted in various different locations and orientations as needed. When the accessory box 22 is attached to the base plate 20, the feet 32 are inserted into the corresponding apertures 30 to mechanically attach the accessory 22 to the base plate 20 in one of the plurality of mounting orientations. The accessory 22 can then be selectively detached from one mounting orientation on the base plate 20 such that the accessory 22 can immediately be reattached in a different one of the mounting orientations.

In one example, the box 22 is held in place by a mechanical locking system that is configured have a locked position where the accessory box 22 is prevented from being removed from the base plate 20 and an unlocked position where the accessory box 22 is allowed to be removed from the base plate 20. An example of such a locking system is found in application Ser. No. 17/993,345 filed on Nov. 23, 2022, which is assigned to the assignee of the subject application, and which is herein incorporated by reference. In one example, the locking mechanism comprises a button 40 that is resiliently biased to extend into the locking aperture 38 (FIGS. 1A-C) on the base plate 20 when the mounting feet 32 are fitted into the corresponding apertures 30 to provide the locked position.

Figures 3A, 3B, 3C, 4:
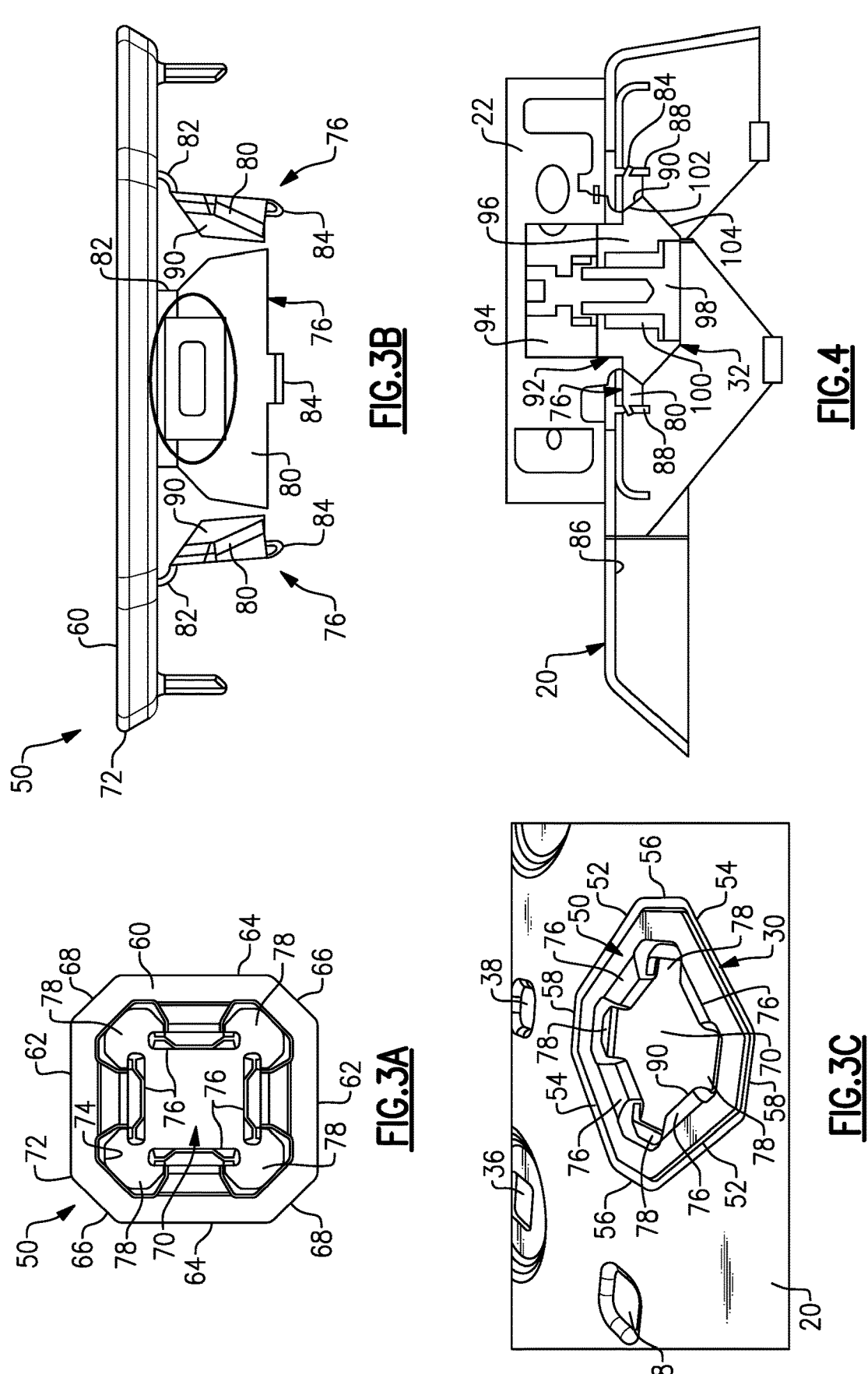
FIG. 3A illustrates a top view of an insert to be installed in apertures formed within a base plate.
FIG. 3B is a side view of the insert of FIG. 3A.
FIG. 3C is a top perspective view of an insert as installed within an aperture in the base plate.
FIG. 4 is a section view of an aperture in a base plate that includes the insert and wherein a mounting foot of an accessory is connected to the base plate through the aperture.

FIGS. 3A-C and 4 show an example of an insert 50 that is used within at least the mounting foot apertures 30 formed in the base plate 20. In one example, the mounting apertures 30 are defined by a polygonal shape. In one example, the mounting apertures 30 have a diamond shape (see FIG. 3C) and the mounting foot 32 comprises a puck 92 (FIG. 4). An example of diamond shaped apertures that receive mounting foot pucks is found in application Ser. No. 17/865,587 filed on Jul. 15, 2022, which is assigned to the assignee of the subject application, and which is herein incorporated by reference.

In one example, the diamond shaped mounting foot aperture 30 is defined by a plurality of straight and linear segments. In one example, each polygonal shape has at least eight linear segments. As shown in FIG. 3C, the mounting foot aperture 30 is defined by a first pair of edges 52 that are parallel and opposite of each other and a second pair of edges 54 that are parallel and opposite of each other. The mounting foot aperture 30 is further defined by a third pair of edges 56 that are parallel and opposite of each other and a fourth pair of edges 58 that are parallel and opposite of each other. The third 56 and fourth 58 pairs of edges are shorter than the first 52 and second 54 pairs of edges and are used to connect the first 52 and second 54 pairs of edges to each other as shown in FIG. 3C. The intersections between ends of the third 56 and fourth 58 pairs of edges and ends of the first 52 and second 54 pairs of edges are at a non-perpendicular angle. The longer first 52 and second 54 pairs of edges in combination with the non-perpendicular intersections provide the mounting foot apertures 30 with an overall diamond shape.

In one example, the insert 50 comprises an outer peripheral surface that is defined by a polygonal shape. In one example, the insert 50 is configured to mimic or match the diamond shape of the mounting foot aperture 30. In one example, the polygonal shape of the insert 50 has at least eight linear segments. In one example, the insert 50 comprises a generally flat upper body portion 60 having an outer periphery formed by a first pair of edges 62 that are parallel and opposite of each other and a second pair of edges 64 that are parallel and opposite of each other. The outer periphery of the flat upper body 60 is further defined by a third pair of edges 66 that are parallel and opposite of each other and a fourth pair of edges 68 that are parallel and opposite of each other. The third 66 and fourth 68 pairs of edges are shorter than the first 62 and second 64 pairs of edges and are used to connect the first 62 and second 64 pairs of edges to each other as shown in FIG. 3A. The intersections between ends of the third 66 and fourth 68 pairs of edges and ends of the first 62 and second 64 pairs of edges are at a non-perpendicular angle. The longer first 62 and second 64 pairs of edges in combination with the non-perpendicular intersections provide the insert 50 with an overall diamond shape.

In one example, the flat upper body portion 60 of the insert 50 includes a central opening 70 that aligns with the mounting foot aperture 30 when the insert 50 is installed on the base plate 20. The flat upper body portion 60 is defined by an outer peripheral surface 72 that defines the polygonal shape and an inner peripheral surface 74 that defines the opening 70. In one example, a plurality of hinges 76 are formed about the inner peripheral surface 74. The plurality of hinges 76 can comprise living hinges, for example. The living hinges are integrally formed with the insert 50 such that they can bend back and forth about a hinge point at the inner peripheral surface 74. When installed in the mounting foot apertures 30, the hinges 76 are bent around edges of the apertures 30.

In one example, an enlarged opening 78 is formed in the upper body portion 60 adjacent each of the third pair of edges 66 and fourth pair of edges 68. The openings 78, in one example, have a mushroom shape with an enlarged head area and a reduced neck portion that is located directly between ends of the hinges 76. The central opening 70 is defined between inwardly facing surfaces of the hinges 76 as shown in FIG. 3A.

In one example, the hinges 76 have a body portion 80 connected to the inner peripheral surface 74 via a hinge portion 82 as best shown in FIG. 3B. The body portion 80 extends to a distal end 84 that can be attached to an underside surface 86 of the base plate 20 as shown in FIG. 4. When the inserts 50 are installed in the apertures 30, the body portions 80 are rotated/pivoted from the unbent position shown in FIGS. 3A-B to the bent portion as shown in FIG. 4. The distal ends 84 can then be snapped or otherwise attached to an attachment feature 88. Once attached, the body portions 80 of the hinges 76 provide a sloped or ramped surface 90 (FIG. 4) that facilitate insertion of the mounting foot 32 through the insert 50 and into the aperture 30.

As shown in FIG. 4, the mounting foot 32 comprises a puck 92 with a head portion 94 and a foot portion 96, where the puck 92 is selectively moveable between a locked position where the puck 92 cannot be detached from the baseplate 20 and an unlocked position where the puck 92 can be detached from the baseplate 20. The head portion 94 and the foot portion 96 are coupled together with at least one fastener connection 98, and a resilient member 100 cooperates with the at least one fastener 98 to provide spring-loaded clamping which allows a desired range of compensation movement between the head portion 94 and the foot portion 96 along a vertical axis. Additional details regarding the puck 92 can be found in the assignees's co-pending application Ser. No. 17/865,587 as discussed above. The puck 92 includes first 102 and second 104 ramped surfaces to further facilitate insertion of the mounting foot 32 through the insert 50 and into the aperture 30.

In one example, the insert 50 is made from a plastic material or other low-friction material. In one example, the insert 50 comprises a polypropylene material that is injection molded.

In one example, the insert 50 can be modified to include other types of attachment features, such as for tie-downs for example. Additionally, the insert can be changed to limit mounting for loading purposes.

In one example, the inserts 50 are only used in the mounting foot apertures 30 to cover any metal edges so the edges do not tear up the mounting feet 32 during insertion. Additionally, the insert 50 is configured to provide the ramp surface 90 with a lead in to give a tightening effect for the mounting feet 32, e.g. a self-tightening feature.

As discussed above, the present disclosure shows inserts 50 only being mounted in the mounting foot apertures 30 formed in the base plate 20. Inserts 50 could also be used in the apertures 36 for the PPI and the apertures 38 for the locking feature 40. In one example, the inserts would be common with the inserts used in the mounting foot apertures, while in another example the inserts could be tailored to specifically accommodate the shapes and/or needs for each of the respective power interface apertures 36 and locking apertures 38.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A base plate for an accessory attachment system, comprising:
a plurality of apertures, wherein at least a first set of apertures of the plurality of apertures are configured to receive a mounting foot from an accessory to be mounted on the base plate; and
an insert that is mounted in apertures of the first set of apertures, wherein the insert includes a surface that is selectively engageable with the mounting foot during insertion of the mounting foot into one aperture of the first set of apertures.

2. The base plate of claim 1, wherein the insert is made from a plastic material.

3. The base plate of claim 1, wherein the insert comprises an outer peripheral surface that is defined by a polygonal shape.

4. The base plate of claim 3, wherein apertures in the first set of apertures have a polygonal shape that matches the polygonal shape of the insert.

5. The base plate of claim 4, wherein each polygonal shape comprises a diamond shape.

6. The base plate of claim 4, wherein each polygonal shape has at least eight linear segments.

7. A base plate for an accessory attachment system, comprising:
a plurality of apertures, wherein at least a first set of apertures of the plurality of apertures are configured to receive a mounting foot from an accessory to be mounted on the base plate; and
an insert that is mounted in apertures of the first set of apertures; and wherein the insert includes a plurality of hinges configured to be bent around edges of the apertures.

8. The base plate of claim 7, wherein the insert comprises a flat upper body portion defined by an outer peripheral surface, and which includes a center opening that aligns with a respective aperture and defines an inner peripheral surface of the respective aperture, and wherein the plurality of hinges are formed about the inner peripheral surface.

9. The base plate of claim 7, wherein the plurality of hinges comprise living hinges.

10. A base plate for an accessory attachment system, comprising:
a plurality of apertures, wherein at least a first set of apertures of the plurality of apertures are configured to receive a mounting foot from an accessory to be mounted on the base plate;
an insert that is mounted in apertures of the first set of apertures; and
wherein the first set of apertures comprise mounting foot apertures, and wherein the plurality of apertures include a second set of apertures that comprise power connection apertures through which the accessory can be connected to a power interface through the base plate.

11. The base plate of claim 1, wherein the first set of apertures comprise mounting foot apertures, and wherein the plurality of apertures include a second set of apertures that comprise locking apertures through which the accessory can be locked to the base plate.

12. An assembly comprising:
a base plate for an accessory attachment system, wherein the base plate includes a plurality of apertures;
at least one accessory to be mounted to the base plate, wherein the at least one accessory includes at least one mounting foot, and wherein at least a first set of apertures of the plurality of apertures comprise mounting foot apertures that are configured to receive the at least one mounting foot; and
an insert that is mounted in each mounting foot aperture, wherein the insert includes at least one surface that is engageable with the at least one mounting foot during insertion of the at least one mounting foot into one mounting foot aperture.

13. An assembly comprising:
a base plate for an accessory attachment system, wherein the base plate includes a plurality of apertures;
at least one accessory to be mounted to the base plate, wherein the at least one accessory includes at least one mounting foot, and wherein at least a first set of apertures of the plurality of apertures comprise mounting foot apertures that are configured to receive the at least one mounting foot;
an insert that is mounted in each mounting foot aperture; and
wherein the plurality of apertures include a second set of apertures that comprise locking apertures through which the at least one accessory can be locked to the base plate, and/or wherein the plurality of apertures include a third set of apertures that comprise power connection apertures through which the at least one accessory can be connected to a power interface through the base plate.

14. The assembly of claim 13, wherein inserts are only mounted within mounting foot apertures.

15. An assembly comprising:
a base plate for an accessory attachment system, wherein the base plate includes a plurality of apertures;
at least one accessory to be mounted to the base plate, wherein the at least one accessory includes at least one mounting foot, and wherein at least a first set of apertures of the plurality of apertures comprise mounting foot apertures that are configured to receive the at least one mounting foot;
an insert that is mounted in each mounting foot aperture; and
wherein each insert is made from a plastic material, and wherein each insert has an outer peripheral surface and an inner peripheral surface that includes a plurality of living hinges to be bent over edges of a respective mounting foot aperture.

16. The assembly of claim 12, wherein the insert comprises an outer peripheral surface that is defined by a polygonal shape, and wherein the mounting foot apertures have a polygonal shape that matches the polygonal shape of the insert.

17. The assembly of claim 16, wherein each polygonal shape comprises a diamond shape.

18. A method comprising:
providing a plurality of mounting foot apertures in a base plate for an accessory attachment system;
providing at least one accessory that includes at least one mounting foot;
installing an insert into each of the mounting foot apertures; and
inserting the at least one mounting foot through the insert in one of the mounting foot apertures to mount the at least one accessory to the base plate.

19. The method of claim 18, including:
providing a plurality of locking apertures through which the at least one accessory can be locked to the base plate, and/or providing a plurality of power connection apertures through which the at least one accessory can be connected to a power interface through the base plate; and
only mounting inserts within the mounting foot apertures.

20. The method of claim 18, wherein the insert has an outer peripheral surface and an inner peripheral surface, and including forming the inner peripheral surface to have a plurality of living hinges and bending the plurality of living hinges around edges that define the mounting foot apertures.

* * * * *